(Model.)
J. ROBERTSON.
LEVEL.
No. 268,826. Patented Dec. 12, 1882.
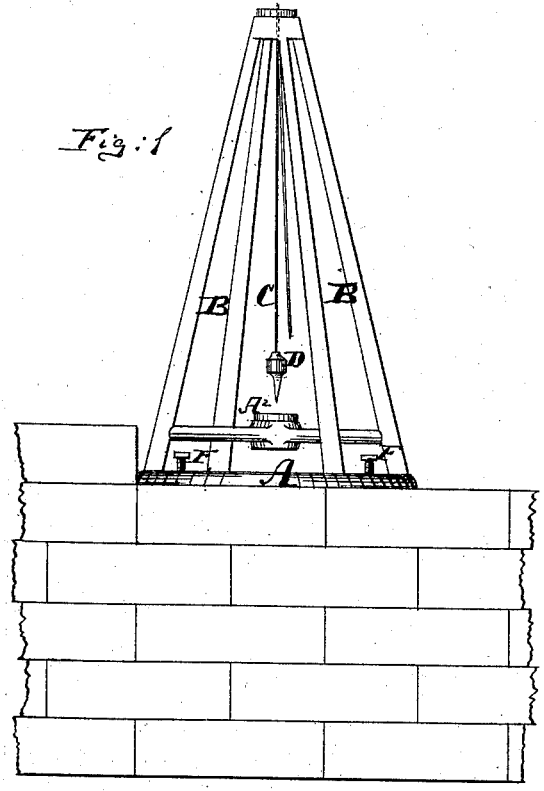
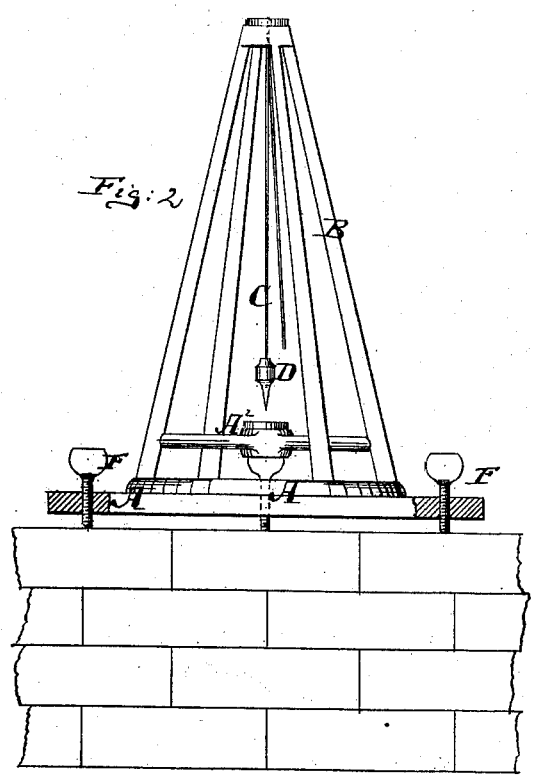
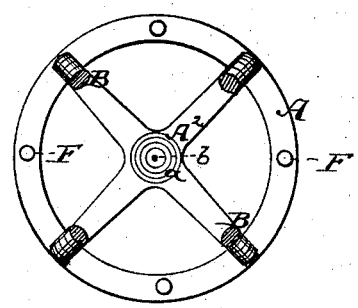
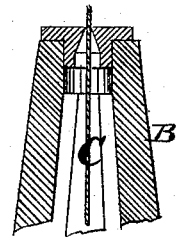
Witnesses:
John C. Tunbridge
Harry McTurk
Inventor:
John Robertson
by his attorneys
Briesen & Betts

UNITED STATES PATENT OFFICE.

JOHN ROBERTSON, OF BROOKLYN, NEW YORK.

LEVEL.

SPECIFICATION forming part of Letters Patent No. 268,826, dated December 12, 1882.

Application filed August 12, 1882. (Model.)

*To all whom it may concern:*

Be it known that I, JOHN ROBERTSON, of Brooklyn, county of Kings, and State of New York, have invented an Improved Level, of which the following is a specification.

Figure 1 is a side view of my improved level. Fig. 2 is a side view of the same on an adjusting-platform. Fig. 3 is a horizontal section of the same. Fig. 4 is a vertical central section of its upper part.

This invention has for its object the production of an instrument by which the degree of inclination or absence of inclination of a nearly or perfectly horizontal surface can be quickly and most accurately ascertained, together with the direction of inclination, if any.

The invention consists in combining with a base-plate, disk, or ring having a flat lower face and an annular gage on or above its upper face an upwardly-projecting frame, which holds a plumb suspended directly above the center of the annular gage whenever the instrument stands on an absolutely level surface.

In the drawings, the letter A represents the base-plate of the instrument. This base-plate is in form of a ring, as shown in Fig. 3, or of a disk or of any other suitable form. It should by preference be made of metal. Its lower surface should be carefully planed or smoothed, so as to be perfectly flat. Upon this base-plate is supported and with it is rigidly connected an upwardly-projecting frame, B. On the upper face of the base-plate A, or, if desired, of a plate, $A^2$, raised above it and held in the frame B, is a gage, $a$, Fig. 3, in form of a circle or series of circles described around a point or center, $b$. Directly above this center $b$ is, in the upper part of the frame B, the point of suspension of a cord, (or its equivalent,) C, carrying a weight, D, at its lower end, which weight reaches nearly to the gage $a\, b$. The lower part of the weight D should by preference be pointed. When the platform or base-plate A rests on a level surface the lower part of the weight D will be directly above the point or center $b$; but when the platform or base-plate A rests on a surface having a greater or less inclination the weight D will be at a corresponding distance from the center $b$, indicating by its position the extent and direction of such inclination.

When desired, the entire apparatus A B C D can be provided with screw-posts F in its lower part, so that by means of the latter the exact measurement of the inclination of the surface on which said apparatus is supported can be measured vertically—*i. e.*, if inclination is shown when the posts all project equally far below the plate A, and the posts should then be adjusted to hold the plate A level, the length of the post that projects farthest will show the exact vertical inclination of the surface on which the instrument stands.

It will be seen that in the erection of walls and wherever correct horizontal faces are required the apparatus described by me will be of great convenience.

I do not claim a slope-indicator operating to show on a vertical scale the position of a pivoted pointer. Such a device shows, like a common level, the inclination in only one single direction. My improved level, employing the cord or flexibly-suspended pointer C above an annular horizontal scale, shows the inclination in every direction of the compass.

I claim—

The base-plate A, having flat lower face, combined with the frame B, cord C, weight D, and horizontal gage or index $a\, b$, all arranged to constitute a level, disclosing inclination in every direction, substantially as herein shown and described.

JOHN ROBERTSON.

Witnesses:
 WILLY G. E. SCHULTZ,
 GUSTAV SCHNEPPÉ.